United States Patent
Arieli et al.

(10) Patent No.: US 12,403,942 B2
(45) Date of Patent: Sep. 2, 2025

(54) SYSTEM FOR OBSTACLE DETECTION

(71) Applicant: Elta Systems Ltd., Ashdod (IL)

(72) Inventors: Gabi Arieli, Nitzan (IL); Rafi Gabbay, Ashdod (IL); Gil Klar, Yavne (IL); Tomer Baum, Moshav Nechusha (IL); Yacov Attias, Ashdod (IL); Rami Shlomov, Even Shmuel (IL)

(73) Assignee: Elta Systems Ltd., Ashdod (IL)

( * ) Notice: Subject to any disclaimer, the term of this patent is extended or adjusted under 35 U.S.C. 154(b) by 416 days.

(21) Appl. No.: 16/715,378

(22) Filed: Dec. 16, 2019

(65) Prior Publication Data

US 2020/0198674 A1    Jun. 25, 2020

(30) Foreign Application Priority Data

Dec. 19, 2018    (IL) .......................................... 263848

(51) Int. Cl.
| | |
|---|---|
| *B61L 23/04* | (2006.01) |
| *B61L 23/34* | (2006.01) |
| *G01S 13/931* | (2020.01) |

(52) U.S. Cl.
CPC ............. *B61L 23/041* (2013.01); *B61L 23/34* (2013.01); *G01S 13/931* (2013.01); *B61L 2205/02* (2013.01); *G01S 2013/9328* (2013.01); *G01S 2013/9329* (2020.01)

(58) Field of Classification Search
CPC .... B61L 2205/02; B61L 23/041; B61L 23/34; G01S 13/426; G01S 13/536; G01S 13/584; G01S 13/589; G01S 13/867; G01S 13/931; G01S 2013/0254; G01S 2013/9328; G01S 2013/9329; G01S 7/354; G01S 7/356
See application file for complete search history.

(56) References Cited

U.S. PATENT DOCUMENTS

| | | | |
|---|---|---|---|
| 8,638,991 | B2 | 1/2014 | Zalevsky et al. |
| 9,636,041 | B2 | 5/2017 | Zalevsky et al. |
| 9,668,672 | B2 | 6/2017 | Zalevsky et al. |
| 2003/0201929 | A1* | 10/2003 | Lutter .................. G01S 13/931 342/72 |

(Continued)

FOREIGN PATENT DOCUMENTS

| | | |
|---|---|---|
| DE | 102016224212 A1 | 6/2018 |
| GB | 1447985 A | 9/1976 |

(Continued)

*Primary Examiner* — Timothy A Brainard
(74) *Attorney, Agent, or Firm* — Ballard Spahr LLP

(57) ABSTRACT

A system and corresponding method are described, for use in alerting on objects in path of vehicle's propagation. The system comprising RF transmission/reception unit comprising at least one phased array antenna unit, and a control unit. The RF transmission/reception unit is configured for periodically scanning a selected region by transmission of interrogating RF signal and collecting reflected RF signals from the selected region and generate based thereon pattern data indicative of the collected RF signal, and for transmitting the pattern data to the control unit. The control unit is configured and operable for processing the pattern data for determining existence of interfering object in path of propagation of a vehicle carrying the system, and for generating alert data indicative of existence of one or more interfering objects.

44 Claims, 9 Drawing Sheets

(56) References Cited

U.S. PATENT DOCUMENTS

| | | | | |
|---|---|---|---|---|
| 2005/0278098 A1* | 12/2005 | Breed | ............... | G01S 7/0234 |
| | | | | 701/45 |
| 2007/0170315 A1* | 7/2007 | Manor | ............... | B61L 23/041 |
| | | | | 348/148 |
| 2011/0251742 A1* | 10/2011 | Haas | ............... | B61L 23/041 |
| | | | | 701/19 |
| 2016/0046308 A1* | 2/2016 | Chung | ............... | B61L 23/047 |
| | | | | 701/20 |
| 2017/0136856 A1* | 5/2017 | Sugie | ............... | B60J 5/0493 |
| 2018/0038958 A1* | 2/2018 | Kawazoe | ............... | G01S 17/42 |
| 2018/0045819 A1* | 2/2018 | Cornic | ............... | G01S 13/34 |
| 2018/0120842 A1* | 5/2018 | Smith | ............... | G01S 7/412 |
| 2018/0174465 A1* | 6/2018 | Ikedo | ............... | B60W 50/0097 |
| 2018/0329034 A1* | 11/2018 | Bilik | ............... | G01S 7/354 |
| 2018/0348343 A1* | 12/2018 | Achour | ............... | H01Q 1/364 |
| 2018/0348348 A1* | 12/2018 | Holleczek | ............... | G01S 7/4812 |
| 2019/0324134 A1* | 10/2019 | Cattle | ............... | G01S 7/024 |

FOREIGN PATENT DOCUMENTS

| | | |
|---|---|---|
| WO | 2016032780 A1 | 3/2016 |
| WO | 2018104454 A2 | 6/2018 |

* cited by examiner

SYSTEM FOR OBSTACLE DETECTION

TECHNOLOGICAL FIELD

The present invention relates to systems for detection of obstacles in the path of propagation of a vehicle. The invention relates in particular to a system for detection of obstacles in the path of propagation of train along train rails.

BACKGROUND

Vehicles often ride in limiting environmental conditions that affect the ride. For example, driving a train or a car in a misty or foggy area may limit a driver's ability to recognize the way ahead. It is thus recommended for drivers to reduce the velocity of the vehicle in accordance with the poor visibility he/she suffers.

Trains utilize pre-employed rails for efficient transportation. This allows the trains to transport a high load with high efficiency. The large loads transported by each train render speed of the train an important parameter in efficiency and reliability of train systems. Reduction in the velocity of vehicles, and specifically trains, may result in significant delays of the arrival of the vehicle to its destination, and of course an economic loss. Moreover, the trains may collide with obstacles that might be found on the path, which results in a great economic loss and is some cases even casualties.

GENERAL DESCRIPTION

The present disclosure concerns a system for alerting on objects in the path of propagation of a vehicle, e.g. a train or a car. The system utilizes a radar unit for transmitting and receiving signals toward a region in front of the vehicle and utilizing data from the received signals to determine a condition of the path. The radar unit transmits signals to a region of interest, which includes an expected trajectory of the vehicle and certain region around it and collected reflected signals to provide data on the region of interest. The system further comprises a control unit, typically comprising at least one processor unit, configured for operating the radar unit and for receiving and processing data received from the radar unit.

Typically, the present technique may utilize selected processing of the collected signals for generating reflection map indicative of a structure of the region of interest. Such reflection map is formed by determining reflection intensity or amplitude from a plurality of points in the region of interest.

The radar unit may be formed by one or more phased array antenna units configured from a plurality of antenna elements arranged in an array, and suitable circuit for receiving and/or transmitting signals. When a single antenna unit is used, it and operated for transmitting interrogating signals and receiving reflected signals using a set of common phased array antenna elements, where the received signals are collected by receiving and transmitting circuits. When two or more antenna units are used, the two or more antenna units may include one or more receiving and one or more transmitting antenna units and corresponding receiving and transmitting circuits. The phased array antenna unit is configured for transmitting interrogating signals with selected beam width and direction toward selected directions determined by phase variations between signal portions transmitted by each antenna element of the array. Further, the phased array antenna units may be used for utilizing received signals to determine distance and direction of a source of a received signal portion.

Thus, the present technique and system utilize the pashed array antenna units for scanning a region of interest, generally ahead of the vehicle, for identifying and alerting for obstacles in the path of the vehicle. Specifically, the interrogating signals may be reflected from various objects in the region of interest, and corresponding reflected signal portions are received in the radar unit, by one or more receiving phased array antenna units. The radar unit generates one or more reflected signal maps based on the reflected signal portions, and transmits data on the reflected signal map to the control unit. The control unit receives the reflected signal maps for processing and for determining data on the region of interest. Such data may include data on the existence of one or more objects in the region of interest and data with respect to the probability that one or more objects may be a cause for alert. For example, the control unit may classify one or more detected objects as interfering objects and non-interfering objects. The control unit may also classify an object as potential interfering objects.

Based on object detection and classification, the control unit may generate alerting data indicative of interfering objects and/or potential interfering objects. The alerting data may be communicated to an operator, e.g. via a user interface, or to a vehicle control system controlling the navigation/cruising of the vehicle. For example, the alerting data can be incorporated in a monitor to provide visual alert to the driver of the vehicle. Such monitor may present an optical imaging representation of the path of propagation of the vehicle including an indication on the interfering or potential interfering objects. The alerting data may be marked in the monitor where the object is expected to be.

Generally, The present technique utilizes a collection of reflected signals for periodically generating reflection maps indicative of objects in the region of interest that reflect portions of the interrogating signals. This technique is used for allowing the present technique to identify stationary (or almost stationary) objects over a stationary background. Accordingly, the control unit may operate the radar unit for periodically scanning the region of interest by interrogating signal, and for processing data in the collected reflected signals for identifying a source of reflections in the region of interest. Further, the use of phased array antenna units, typically configured for providing narrow interrogating beams, high angular resolution and low side lobes, allows detection of reflection sources at distanced of 500 m to 5 km ahead of the vehicle. This large detection distance is advantageous for use in trains, where traveling speed is relatively high, changes of traveling speed may cause disturbance to passengers and financial loss, and in general braking distance may be relatively long.

Additionally, the use of reflection mapping obtained by high resolution phased array antenna units (for transmitting and receiving signals) may enable detection of the projected propagation path of the vehicle. In the case of trains, the propagation path may typically be well defined and recognizable based on a layout of rails ahead of the vehicle. In some configurations, the control unit may operate for processing the reflection map data for identifying projection of the path within the reflection map and utilize data on the path for classifying objects' interference. This allows the system to classify objects that are outside path of propagation of the train and non-interfering and classify objects within the propagation path as interfering, thereby generate relevant alerts and avoid false positive alerts.

In some configurations, the system may also include an optical detection unit. The optical detection unit may include one or more camera units configured for collecting image data of the region of interest using one or more selected wavelength ranges. The optical detection unit is configured for generating image data of the region of interest using one or more of visible light, shortwave infrared and long wave infrared radiation, and for transmitting the image data to the control unit. The control unit may utilize image data received from the optical detection unit for determining type and identity of one or more objects detected based on the reflection map provided from the radar unit. This allows the system to provide a visual alert to an operator on interfering or potentially interfering objects, as well as for use in object recognition for determining a level of danger from a potential interfering object and further reduce the risk of false alerts.

Thus, an aspect of the present disclosure provides a system for alerting on objects in the path of vehicle's propagation. The system comprises an RF transmission/reception unit, e.g. a radar unit that comprises at least one antenna unit. The antenna unit is configured to scan a selected region by transmitting RF signals to the selected region and collecting reflected signals therefrom. The scanning is performed periodically, when the selected region is updated over time. More specifically, the system may operate to scan a region ahead of a moving vehicle on which the system is installed, and the selected region varies in accordance with the propagation of the vehicle. The RF transmission/reception unit generates pattern data based on collected reflected signal portions from the selected region. Such reflections pattern data is typically indicative of various reflecting objects that may be located in the selected region. The pattern may include topographic structures in the path, i.e. the pattern of the terrain, or objects that may be found on the path, e.g. animals, metals, traffic lights, etc. The pattern data is transmitted to a control unit of the system that is configured and operable for processing the pattern data and for determining the existence of interfering object(s) in the path of propagation of a vehicle carrying the system. Based on the determination of interfering object(s), an alert data is generated that is indicative of interfering object(s) in the path of propagation of the vehicle. The control unit may generally be configured as a computer system comprising one or more processors, memory utility, and input/output communication module.

In some embodiments of the system, the antenna unit comprises at least one phased array antenna. For example, the phased array antenna may be used for transmitting interrogating signals and for using the transmitted signal for scanning the selected region, and for receiving reflected RF signal portions. The phased array antenna unit may typically be configured for obtaining high-angular resolution. More specifically, the phased array antenna unit may comprise a plurality of 50 or more, or 100 or more, or 1000 or more antenna elements arranged in a selected array configuration, to allow beam steering by selected phase variations between signal portions transmitted by the antenna elements.

In some embodiments of the system, the control unit is configured to generate reflected signal map of the collected reflected RF signals and identify therein objects reflecting RF signals in said selected region.

The signal map may include data of the intensities of the collected reflected signals, and the distance and azimuth/angle from which each signal has been reflected from with respect to the RF transmission/reception unit. In other words, the signal map is a spatial representation of intensity of reflected signals from the selected region. Therefore, the signal map provides data on existence and relative location of interfering objects.

In some embodiments of the system, the control unit is configured for determining projected propagation path profile of one or more objects in the pattern data. For example, in the instance the identified object is an animal, e.g. a human, the control unit determines a projected propagation path of the human according to its current velocity (value and direction).

The system may include a pre-stored data that is indicative of the propagation path of the vehicle. The control unit may be configured to obtain the pre-stored data for generating operational data indicative of a desired scanning profile. The operational data is transmitted to the RF transmission/reception unit and executed thereby to perform a scan such that the desired selected region is determined based on the operational data.

In some embodiments of the system, the control unit is configured to identify in the reflected signal map a projected path of propagation of the vehicle. By identifying the projected path of the vehicle in the signal map, a relation between identified objects in the signal map and the projected path of the vehicle may be determined. The relation may be indicative of a likelihood of the object to interfere with the propagation path of the vehicle. The likelihood of the object to interfere with the propagation path of the vehicle may also be affected by the determined projected propagation path profile of the object. For example, if an object has a velocity that converges with the projected propagation path of the vehicle, the likelihood if interference rises and vice versa.

In some embodiments of the system, the alert data comprises data indicative of a likelihood of a collision of said vehicle with said one or more interfering objects.

In some embodiments of the system, the control unit is further configured for transmitting said alert data for providing data to an operator of the vehicle. It should be noted that an operator of the vehicle may be a human or automatic machine-based operator that operating an autonomous vehicle.

The alerting data may trigger an action related to the operation of the vehicle, e.g. steering and/or accelerating/decelerating the vehicle.

In some embodiments of the system, the RF transmission/reception unit is mounted in a front portion of a vehicle, and the selected region comprises a region in front of said vehicle. The vehicle may be, for example, a train or a car.

In some embodiments of the system, the control unit is being connectable to one or more optical imaging units and adapted for receiving image data pieces associated with one or more images of said selected region collected by the one or more optical imaging units. The control unit is configured for processing the image data pieces and determining correlations between objects detected in the signal map of collected reflected RF signals and objects in the image data pieces.

Based on the correlation between objects in the signal map and objects in the image data, the presentation of relevant interfering objects may be adjusted by one more of the following: marking the object with a special mark, allocating more optical imaging resources to image the object or optically/digitally zooming in on the object.

In some embodiments, the system further comprising the one or more optical imaging units adapted for collecting one or more image data pieces.

The system may further comprise a user interface for presenting selected image data and marking existence and location of detected object in the image data based on the correlation between objects detected in the signal map of collected reflected RF signals and objects in the image data pieces.

In some embodiments of the system, the one or more optical imaging units are configured and operable in one or more of the following wavelength ranges: visible spectrum, shortwave infrared and long wave infrared. The output of the one or more optical imaging units may be a single representation based on imaging data received from all the optical imaging units. In another embodiment of the system, there may be several representations, each is based on one or more imaging data from one or more optical imaging units.

In some embodiments, the system may also comprise one or more light sources configured for directing illumination of one or more wavelength ranges (e.g. visible and or infrared illumination) toward the region of interest. The one or more light sources are selected to provide illumination detectable by the one or more optical imaging units to thereby enable optical imaging in dark conditions, or for non-radiation-emitting objects. Such one or more light sources may typically be high-intensity light sources such as laser-based light source or high intensity light source including one or more reflectors for directing the illumination toward the region of interest.

The control unit further processes the pattern data to generate illumination operating data indicative of operational data of illumination of said one or more light sources. In other words, the control unit may operate the one or more lights sources according to a demand that is derived from findings in the pattern data, e.g. identification of an object or a potential object. The operational data may comprise direction, intensity, time period or any combination thereof. The control unit is in data communication with the one or more light sources to transmit the illumination operating data thereto, and the illumination operating data is being executed by the one or more light sources to provide a desired illumination pattern. For example, the control unit may operate the one or more light sources for directing illumination toward one or more locations where interfering or possible interfering objects are detected based on input from the RF unit. This allows the system to provide visual presentation of the objects and simplify object recognition by the processing utility and/or by an operator of the vehicle.

In some embodiments of the system, the one or more optical imaging units are configured for selectively collecting image data streams at selected time periods based on the illumination operating data. For example, the one or more optical imaging units are configured to image in selected time periods that are expected to include reflected illumination of the light of the light source from a specific object of interest.

The above-described imaging may be based on a gated imaging technique, e.g. laser-based gated imaging, by controlling the exposure of the imaging units. In gated imaging, image contrast is enhanced by limiting the exposure time of the camera to the return time of an emitted light pulse from an object at a defined distance 'd'. For example, in case the light source and the camera are located at similar plane, the exposure time may be selected to occur at a time $\Delta t$ after light pulse emission given by $\Delta t = 2d/c$ (where 'c' is the speed of light). This allows the imaging unit to provide visual representation of objects at selected distance from the vehicle with improved signal to noise ratio, and to remove details associated with reflections from other objects in the region of interest.

In some embodiments of the system, the control unit comprises a signal map generating module configured for receiving data on reflected RF signal and for generating corresponding reflected signal map comprising at least two-dimensional data indicative of one or more objects reflecting RF signals in said selected region.

In some embodiments of the system, the control unit further comprising an image recognition module configured and operable for receiving and processing said reflected signal map for identifying one or objects associated with objects reflecting RF signals in said selected region.

In some embodiments of the system, the control unit further comprising a vehicle projected path module configured and operable for identifying projected path of the vehicle in said reflected signal map.

In some embodiments of the system, the control unit further comprising an obstacle identifying module configured and operable for processing said reflected signal map for determining a relative position of an object with respect to the projected propagation path of the vehicle, thereby determining obstacle level of said object. In some embodiments of the system, the at least one antenna unit of said RF transmission/reception unit is configured for generating RF beam scanning the selected region and for collecting reflected signal therefrom for providing data of reflected RF signals.

In some embodiments of the system, the RF transmission/reception unit comprises least one receiving phased array antenna unit.

In some embodiments of the system, the RF transmission/reception unit comprises least one transmitting phased array antenna unit.

In some embodiments of the system, the at least one antenna unit is configured with a large aperture with respect to the wavelength of the RF signal. Namely, at least one dimension of the aperture is of length that is at least 200, 300, 400, 500, 600, 700, 800, 900 or 1000 times the wavelength of the RF signal transmitted by the RF transmission/reception.

In some embodiments of the system, the at least one antenna unit is configured to provide a narrow beam and direct the beam for scanning a selected scanning sector, being at least a part of the region of interest, with high angular resolution for scanning. The scanning beam may be used for scanning the entire region of interest periodically, or directed for providing repeating scan of one or more selected sectors in accordance with data of the projected path of the vehicle. For example, when rails on which the train is moving are of known path, the scanning sector may be limited to a limited region around the projected path of the rails. The scanning sector may apply to a narrow region around the rail path, typically encompassing between 50 meters and a few meters, e.g. 1-5 meters, on either side of the rail path.

In some embodiments of the system, the at least one antenna unit comprises sufficient number of elements to produce real beam resolution compatible with obstacle size of a few tens of centimeters, arranged in at least one-dimensional array along the width dimension of the vehicle. The angular beam width may not exceed 10 milliradians or in some embodiments may not exceed 1 milliradians, to provide angular resolution greater than 10 m at a distance of 1 km, or 1 m at a distance of 1 km, respectively.

The RF transmission/reception unit may be configured to selectively filter reflected signals according to their range from the RF transmission/reception unit or from the system. Therefore, pattern data and the signal map generated based thereon is performed on reflected signals that are derived from a desired range from the transmission/reception unit.

In some embodiments of the system, the RF transmission/reception unit is configured to receive signals in predetermined time slots for detecting reflected signals from a predetermined sub-region. In other words, the RF transmission/reception unit transmits signals to the selected region and process only signals that are derived at a predetermined time from the transmission time of the signal, corresponding to a time of signal propagation to a desired range in the selected region and back to the RF transmission/reception unit, after being reflected from an object in the desired range in the selected region.

Another aspect of the present disclosure provides a method for alerting on objects in a path of a vehicle's propagation. The method comprising: (i) transmitting interrogating RF signal to a selected region and collecting reflecting RF signals therefrom; (ii) generating pattern data indicative of the collected RF signals; (iii) processing the pattern data to determine existence of interfering object in the path of propagation of the vehicle; and (iv) generating alert data indicative of existence of one or more interfering objects.

In some embodiments of the method, the step of processing comprises generating a reflected signal map of collected reflected RF signals and analyzing the reflected signal map to identify one or more objects in said map, being indicative of one or more objects reflecting RF signals in said selected region.

In some embodiments of the method, the signal map comprises a spatial representation of intensities of the reflected signals with respect to the vehicle's real-time location.

In some embodiments of the method, the processing comprising determining projected propagation path profile of one or more objects in the pattern data.

In some embodiments of the method, the processing comprising obtaining pre-stored data indicative of propagation path of said vehicle in said selected region, generating operational data indicative of a desired scanning profile, and executing the desired scanning profile.

In some embodiments of the system, the processing further comprising identifying, in said reflected signal map, projected path of propagation of the vehicle.

In some embodiments of the system, the processing further comprising identifying for each object in the map, a likelihood measure indicative of likelihood of the object to interfere with path of propagation of said vehicle.

The likelihood measure may be determined in accordance with the location of the object with respect to the projected path for propagation of the vehicle.

In some embodiments of the method, the alert data includes data indicative of likelihood of a collision of the vehicle with the one or more interfering objects.

In some embodiments, the method further comprising transmitting the alert data to an operator, e.g. an operating system of the vehicle or an automatic operating system that controls the operation of the vehicle.

The vehicle may be a train or a car, operated by a human or by an automatic operating system.

In some embodiments, the method further comprising receiving image data pieces associated with one or more images of the selected region collected and processing the image data pieces to determine correlations between objects detected in the map of collected reflected RF signals and objects in the image data pieces for determining data on the detected objects.

In some embodiments, the method further comprising presenting selected image data and marking existence and location of detected object in the image data based on the correlation between objects detected in the map of collected reflected RF signals and objects in the image data pieces.

In some embodiments, the method further comprising imaging at least portions of the selected region to obtain the image data pieces with one or more of the following wavelength ranges: visible spectrum, shortwave infrared and long wave infrared.

In some embodiments, the method comprising selectively filtering reflected signals according to their distance from the vehicle.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

The following figures are provided to exemplify embodiments and realization of the invention of the present disclosure.

Figure 1A:
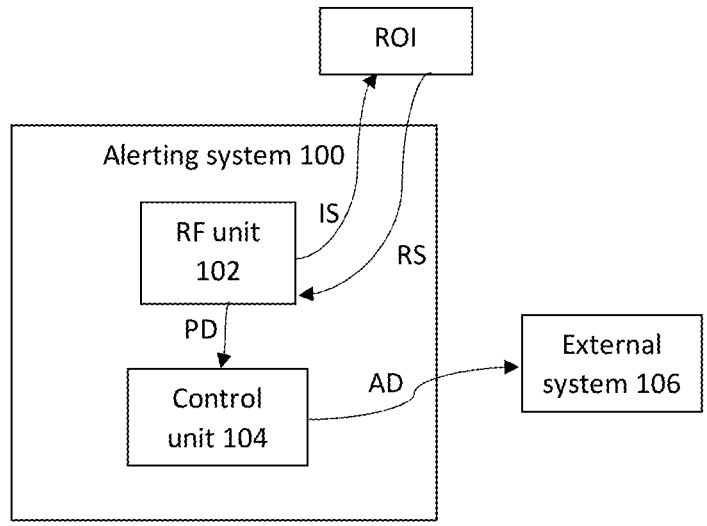
FIGS. 1A-1F are non-limiting examples of block diagrams of various embodiments of the system of the present disclosure.

FIG. 1A-1E are block diagrams illustrating non-limiting examples of the system according to embodiments of the invention of the present disclosure. FIG. 1A shows an alerting system 100, generally suitable for use in a vehicle for providing alerts of objects with likelihood to interfere in the course of propagation of the vehicle. The alerting system 100 includes an RF unit 102 (also referred herein as radar unit) that is configured to transmit interrogating RF signals IS to a region of interest ROI, generally located ahead of the vehicle. The interrogating signals IS are directed for scanning of the region of interest, typically by steering a narrow interrogating beam to cover the region of interest. The RF unit 102 is further configured for collecting reflected signal portions RS reflected from objects in the region of interest ROI and generate based thereon, pattern data PD. The pattern data PD is generally formed from signal portions collected by different antenna elements of the RF unit 102 as described further below, and time delay of reception as compared to the transmission of the interrogating signals. As generally known in the field of a phased array antenna, such pattern data PD is indicative of distances and direction from the source of the received reflected signals RS with respect to the RF unit 102 and their intensity. Accordingly, in some embodiments, the present technique may utilize the pattern data PD in the form of spatial mapping of the regions of interest, using reflection data illustrating location of one or more features or objects in the region of interest and reflected signal intensity values in each coordinate of the spatial mapping (see example below in FIG. 4).

The pattern data PD is communicated to a control unit 104 to be analyzed therein. The control unit 104 identifies objects in the region of interest ROI using a reflection map formed by collected reflections from the region of interest and data on direction and distance of source for the collected reflections. The control unit may also identify projected propagation path of the vehicle along the region of interest on the reflection map, or utilize pre-provided data on propagation path (generally along rails of a train). The control unit may thus operate for determining a relation between one or more objects or features identified in the reflection map and the expected path of propagation of the vehicle. The control unit 104 utilizes data on the propagation path and data on the object for determining likelihood measure indicative of a probability that the object may interfere with the propagation of the vehicle. More specifically, the control unit may determine if an object is located within projected propagation path of the vehicle. In some configurations, the control unit may determine an estimation if an object will be on the propagation path of the vehicle based on data of location of the object in several different times (corresponding to different scans). When an object is determined as an interfering object, the control unit generates alerting data AD that is communicated to an external system 106, which may be a user interface that controls the operation of the vehicle, e.g. a user interface of a control system of a train.

Figure 1B:
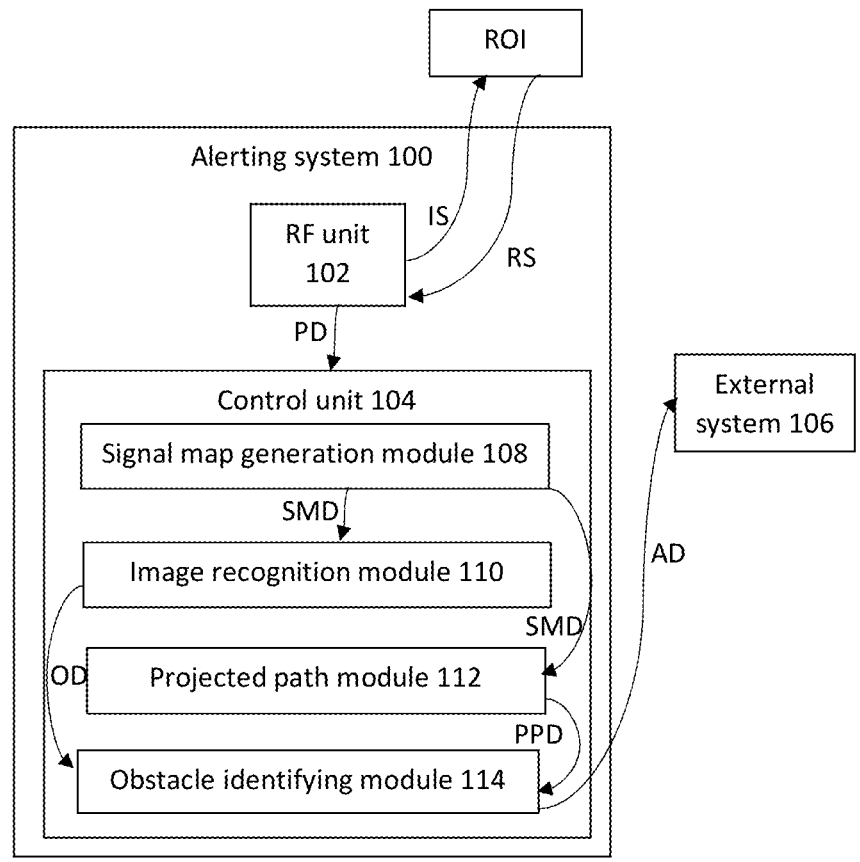

FIG. 1B is a block diagram of a non-limiting example detailing some functionalities of the control unit 104 of the alerting system of the present disclosure. In this connection, it should be noted that the control unit may typically be configured as a computer system including one or more processors, memory utility and suitable input and output communication ports. The control unit may include suitable hardware or software modules, e.g. associated with the one or more processors, used for performing selected processing tasks.

In the example of FIG. 1B, the control unit 104 includes a signal map generation module 108, image recognition module 110, projected path module 112 and obstacle identification module 114. The map generation module 108 is configured to receive the pattern data PD and analyze it to generate a signal map data SMD indicative of the received reflected signals RS and their spatial intensity distribution. The signal map data SMD is communicated to an image recognition module 110 that is configured to identify objects in the signal map data SMD and generate objects data OD indicative of identified objects in the region of interest ROI, their relative position with respect to the alerting system 100, and may include additional data on such objects such as estimated object size. Generally the signal map generation module 108 may utilize the pattern data PD received from the RF unit 102, and based on data on time delay between transmission of interrogating signal and collection of signal portion by different antenna elements of the antenna unit, and phase or time delay variations in collection of the signal portion by the different antenna element, for determining a reflection map of the region of interest. Such reflection map typically includes azimuth and distance of various surfaces reflecting signals back to the RF unit 102.

Figure 1C:
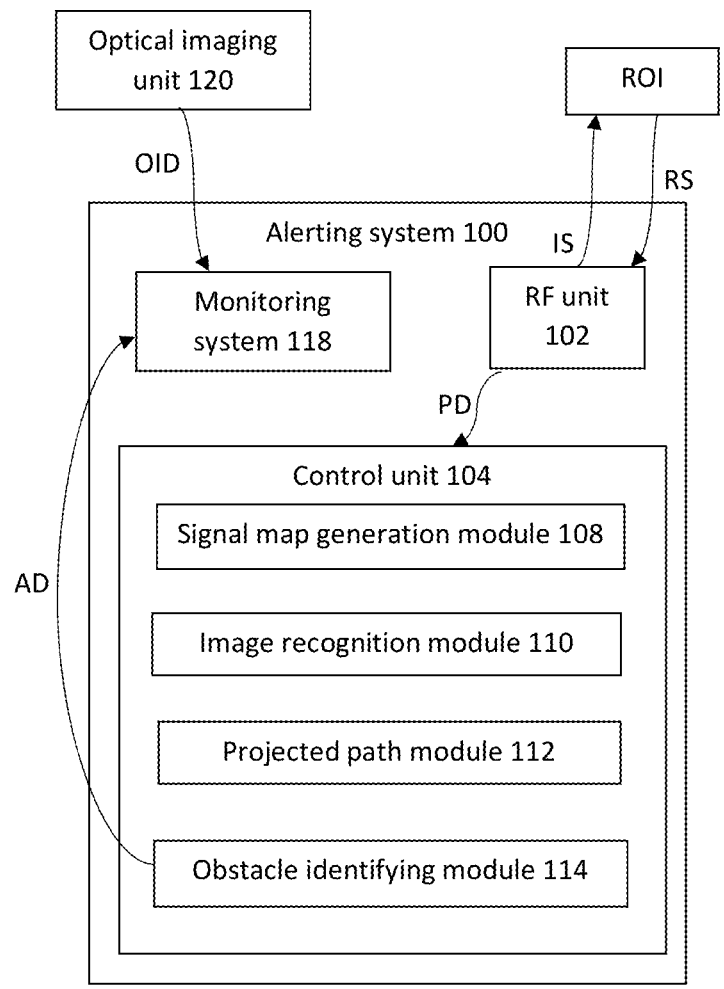

The control unit 104 further includes a projected path module 112 that is configured to receive the signal map data SMD and identify within the map of reflected signal portions, a path associated with projected propagation path of the vehicle in the region of interest ROI and generate propagation path data PPD indicative thereof. The projected path data is used to determined interference level of objects found in the region of interest, as objects that are not located on the path of the vehicle are generally considered as non-interfering objects. The projected path module 112 may also utilize pre-stored travel data that may be stored in a memory utility and include data on the expected path of the vehicle. For example, when the vehicle is a train, the path may be predetermined according to the railroad tracks on which the train drives. Data of the path may be stored in memory utility and be accessible in combination with location data (e.g. GPS data), additionally or alternatively, the path may be identified from the signal map data SMD in accordance with reflections of the radar signals from the rails, or from other objects marking the rails (e.g. trees, poles etc. located at sides of the rails). Therefore, the propagation path data PPD may be generated based on reflected signal map SMD by itself, or in combination with stored data about the propagation path of the vehicle. The obstacle identifying module 114 is configured to receive the objects data OD and the propagation path data PPD and determine a relation therebetween to identify objects that are obstacles in the expected path of the vehicle. Upon recognition of an obstacle, the obstacle identifying module 114 generates alert data AD that is communicated to an external system 106 that make use of this data. In this connection, the obstacle identification module 114 may operate to determine a physical overlap between locations of identified objects and path of the vehicle, and may also determine a size of the object. Further, the control unit 104, or the obstacle identification module 114 thereof, may store data on identified objects between scans in the memory utility. Upon identifying objects, the obstacle identifying module 114 may obtain data on objects identified in one or more previous scans and determine mobility level of identified objects. Generally, a stationary object having a size above a selected threshold may be considered as interfering and a cause for alert. In some configurations, the control unit may also operate for determining the projected trajectory of moving objects and generate an alert if the projected trajectory is intersecting with the path of the vehicle. FIG. 1C exemplifies another embodiment of the alerting system 100. In this example, the system further includes a monitoring system 118 and an optical imaging unit 120 configured for providing optical data on the region of interest. More specifically, optical imaging unit 120 includes one or more camera units, operable is respective one or more wavelength ranges (e.g. visible light, shortwave infrared and long wave infrared) and is configured for transmitting collected image data pieces OID to the optical monitoring system 118. The optical monitoring system 118 is configured for receiving the optical imaging data OID from an optical imaging unit 120 and for processing it in accordance with data on objects identified in the region of interest ROI. Generally, the monitoring system 118 is configured for providing data for visual representation of the optical imaging data OID such that a user may monitor the projected propagation path.

The monitoring system 118 may be further configured to receive data on one or more objects identified in the region of interest, e.g. alert data AD generated by the control unit 104, or in this specific embodiment by the obstacle identifying module 114, and perform one or more object recognition processing of the optical imaging data OID for determining type of the identified objects. Such optical data may be used for presenting image data associated with the alert data AD to provide a visual representation of the identified object to an operator. For example, the relevant data of obstacles from the alert data AD may be marked on their visual representation in the monitoring system 118 such that a user may relatively easy recognize the obstacle and act accordingly.

Figure 1D:
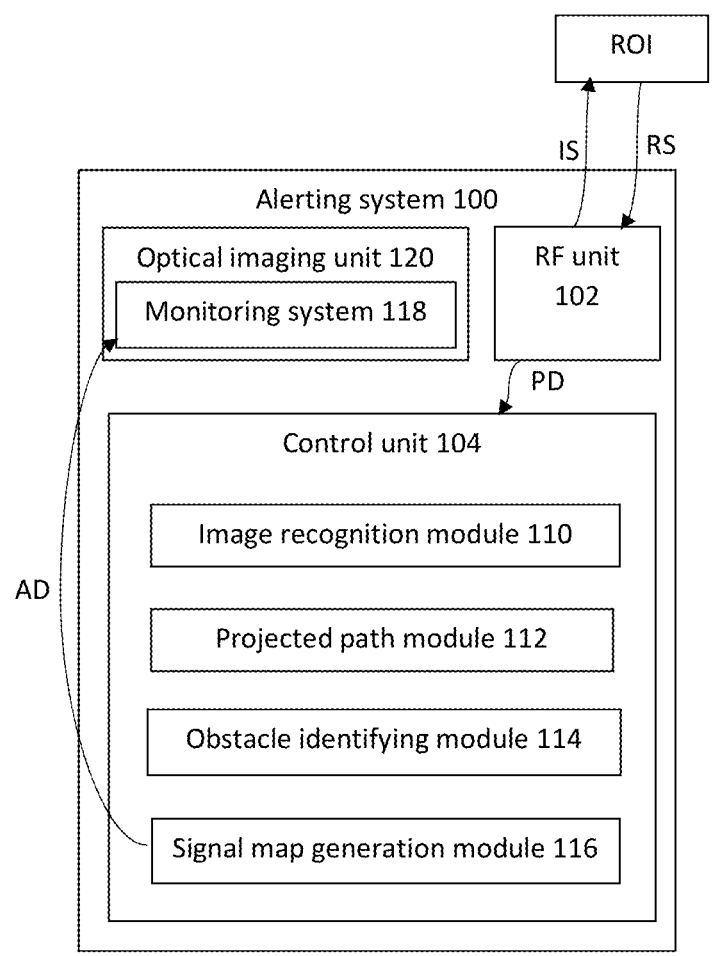

FIG. 1D illustrates an additional configuration of the alerting system 100. In the example of FIG. 1D the optical imaging unit 120 is being part of the alerting system 100 and comprises the monitoring system 118.

Figure 1E:
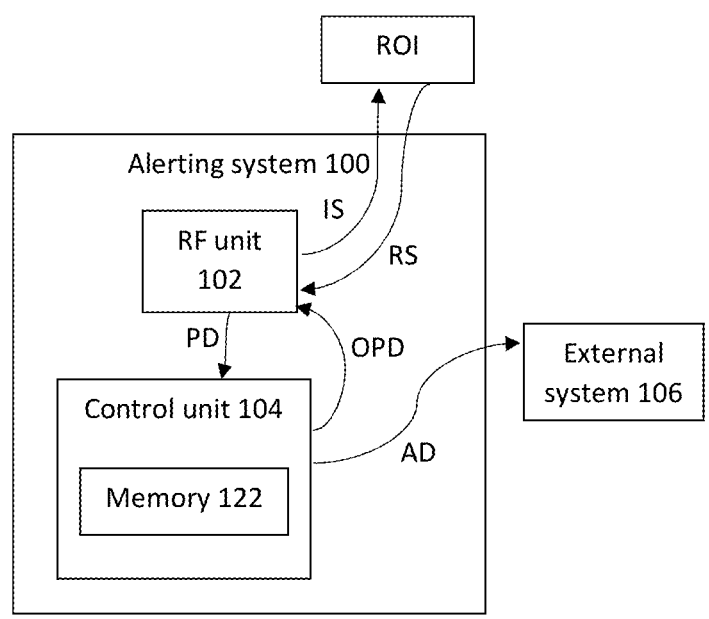

FIG. 1E shows another non-limiting example of an embodiment of the system of the present disclosure. In this non-limiting example, the control unit 104 is illustrated including a memory utility 122 that stores data of expected propagation path of the vehicle. For example, if the vehicle is a train, the stored data may include the route of railroad tracks that the train follows to reach its destination, as well as one or more threshold and rules for determining interfering objects based on size and/or object type. The control unit 104 extracts the relevant data, according to the real-time position of the vehicle (e.g. by a GPS system) and transmits operational data OPD that is indicative of a scanning profile of signals to be performed by the RF unit 102. The RF unit 102 executes the operational data OPD such that a desired data from the selected region is collected and the pattern data is generated based thereon.

Figure 1F:
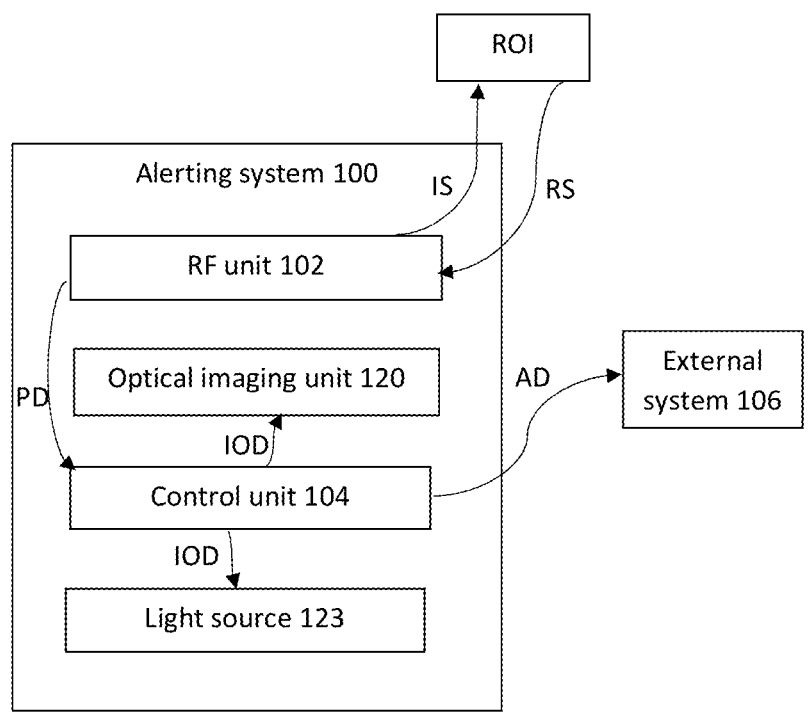

FIG. 1F shows another non-limiting example of an embodiment of the system of the present disclosure. This example shows that the alerting system 100 further includes a light source 123 that is configured to produce illumination detectable by the optical imaging unit 120. The optical imaging unit 120 may have at least one module that is configured to detect the illumination provided by the light source 123, e.g. illumination in the visible spectrum, shortwave infrared and long wave infrared spectrum. The control unit 104 is configured to operate the light source 123 by transmitting illumination operating data IOD to the light source 123 that is indicative of at least one of: illumination intensity, illumination direction, illumination period and illumination beam width. The control unit 104 generates the illumination operating data IOD based on the pattern data PD that is received from the RF unit 102. The light source 123 executes the illumination operating data IOD and illuminate desired sections, typically with a relatively high intensity illumination, that its reflection is being detected by the optical imaging unit 120. The optical imaging unit 120 may be configured to receive the illumination operating data IOD so as to operate an imaging session to detect the expected reflected light of the light source 123 from the desired section. In other words, the optical imaging unit 120 images only at a time period and/or at a specific direction that is expected to include the reflection of the emitted light of the light source 123 from a specific area/section.

It should be noted that the examples of FIGS. 1A to 1F focus on selected elements of the system while generally describe various configurations of the alerting system. Generally system elements from FIGS. 1A to 1F may be combined between them to provide the alerting system of the present invention.

Further, in the figures throughout the application, like elements of different figures were given similar reference numerals shifted by the number of hundreds corresponding to the number of the figures. For example, element 202 in FIG. 2 serves the same function as element 102 in FIGS. 1A-1F.

Figure 2:
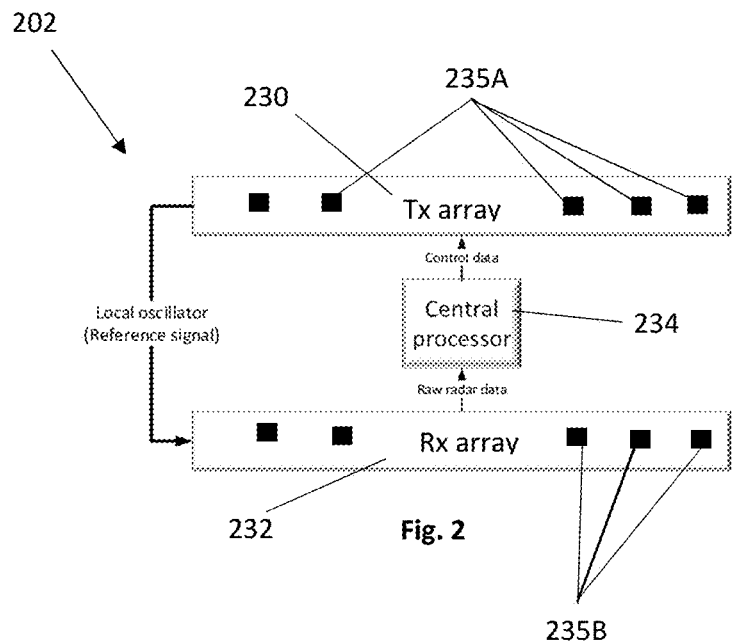
FIG. 2 is a non-limiting example of an embodiment of the RF unit of the present disclosure.

FIG. 2 is a non-limiting example of an embodiment of the radar unit 202 (also referred herein as RF unit with reference to FIGS. 1A to 1F), for use with the alerting system of the present disclosure. The radar unit 202 generally includes one or more antenna units configured as phased array antenna units, receiving 232 and transmitting 230 antenna arrays as exemplified in FIG. 2, and a control circuit/processing 234. The antenna array 230 and 232 are configured as phased array antenna units having a plurality of antenna elements 235A and 235B configured for collectively transmitting/receiving RF signal using phased array configuration. This technique allows transmitting of a relatively narrow interrogating beam for scanning the region of interest, and for identifying direction and distance of reflection sources from the collected RF signal portions. The radar unit 202 may employ FMCW (Frequency Modulation Continuous Wave) topology technique, and may include a transmission array 230 for transmitting RF signals, a receiving array 232 for receiving and detecting reflected RF signals, and a main processing unit 234. Generally, the receiving antenna unit 232 may be operable for continuously collecting reflected signal portions and generate raw collection data for processing. The central processing circuit 234, or control unit 104 (illustrated in FIGS. 1A to 1F) may be operable for receiving the raw data and for generating pattern data based on time delay for collection of reflected signal portions as collected by each of the antenna elements of the receiving antenna array 232.

In addition to the FMCW technique used to achieve the high range and high angular resolution, Doppler technique may be used for marking targets/obstacles located off the main beam direction and for omitting such objects from processing. Specifically, according to some examples, the frequency modulated signal is transmitted via the transmission antenna array 230 toward a selected direction, and propagates through the air. The signal is reflected from objects in front of the radar unit 202, and received by the reception antenna array 232. The reflected signal portions are collected by elements of the receiving antenna array 232, and distance and direction of the reflecting source are determined in accordance with time delay for collection of the signal portions by the different elements of the array 232. As the vehicle (e.g. train) is moving forward the radial velocity of objects located in general path of the main beam is different from the radial velocity of objects that are off the main beam (associated with side lobes). This results in variation in Doppler frequency shift between objects located along the main RF beam and objects reflecting signals originating from side lobes of the RF transmission. The radar is using the difference in Doppler frequency in order to further attenuate reflections that are off the direction of the main beam of the antenna, which enhances signal to noise ratio and scanning resolution of the RF unit 102.

As indicated, the transmission array 230 includes multiple antenna elements 235A, configured for forming desired electromagnetic beams that can be electronically directed toward different angles, thereby allow scanning of the region of interest. By using multiple antenna elements 235A, the transmission array 230 is configured to concentrate its energy in desired directions to provide higher signal-to-noise (SNR) for selected regions of interest. The main processor unit 234 is configured to operate and control the transmission array 230 to execute the desired electromagnetic beam to the desired region of interest. The reflected signals from the selected region of interest are received in the reception array 232 and are used to generate a 2-dimensional intensity map of the area in front of the radar unit 202.

The reception array 232 comprises multiple antenna elements 235B, each sampled individually by an analog-to-digital converter (ADC—not shown), for forming multiple collection beams, digitally and simultaneously. It should be noted that the collection beams may be virtual beams associated with processing of collected signal portions while applying suitable phase variations/time delay to signal portions collected by the different antenna elements 235B To achieve the required coverage the radar unit may use digital beamforming, Multiple Inputs, Multiple Outputs (MIMO) technique, or combination thereof. By transmitting simultaneously using all the elements in the transmission array the radar unit may provide a relatively narrow beam, e.g. of an angular width of 0.1°-0.5° or at times 0.2°-0.3°, which provides fine-resolution images at high contrast. Alternatively, by employing a MIMO technique, the radar may transmit lower power levels and achieve the required performance by temporally integrating signals.

The radar unit 202 may be operated at the W-band frequencies, such as 76-81 GHz. By using such relatively high frequency, the radar is able to provide high angular resolution using a relatively small antenna. Furthermore, operating at these frequencies permits using large bandwidth, which results in a desired relatively high range resolution.

Using FMCW technique may be advantageous as it is simple to implement in various antenna configurations, requires low transmission power as relative to pulsed radar techniques, allow extraction of range and Doppler variation using Fourier analysis (e.g. by applying Fast Fourier Transform (FFT) on collected data), and provides collection of baseband signal avoiding the need for high sampling rates to provide efficient analog to digital conversion (ADC).

In some embodiments of the system, the radar unit is installed on the front end and/or the rear end of a vehicle (e.g. train) at a selected angle facing forward to provide efficient coverage of a region in front of the vehicle. Generally, the present technique is provided for allowing scan and detection distance of 1.5 Km or preferably up to 5 Km ahead of the vehicle, while having an angular width of 20°-60° and in some configuration up to 85°. The radar unit 202 operates to scan the area in front of the train, e.g. electronically, by employing at least one of digital beam-forming and MIMO techniques, and generates a digital intensity signal map of the objects and scatters in the area. The signal map may be pre-processed by the processing circuit 234 for generating pattern data and further processed analyzed by the main control unit 104 to identify the railroad tracks and/or the vicinity thereof, and to generate alerting data for objects on the rails or the vicinity thereof, that may interfere with the propagation of the train. The alerting data may undergo a filtration process by the main processor unit 104 to provide higher certainty level of alerts by filtering out spurious detections.

Figure 3:
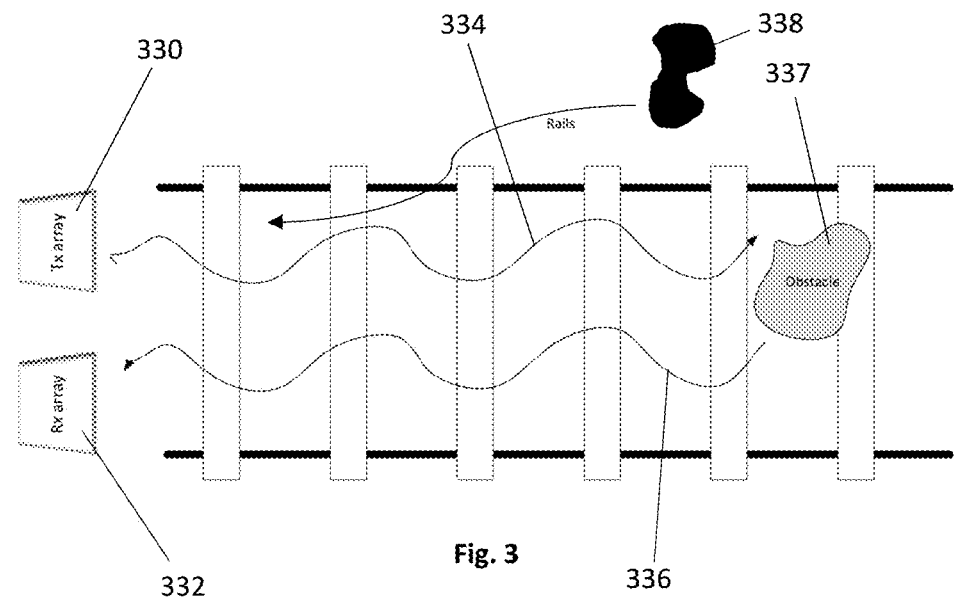
FIG. 3 is a schematic illustration of a non-limiting example of a scan process of the radar unit that is installed on a train.

FIG. 3 is a schematic illustration of a non-limiting example of a scan of the radar unit that is installed on a train. Transmission array 330 transmits a scanning interrogating signal 334 directed for scanning a region having selected angular width in front of the vehicle. In this example, FIG. 3 illustrates a sub-region being directly in front of a train exemplifying projected path of the vehicle based on rails ahead of the vehicle. The interrogating signal 334 propagated towards the expected path of propagation of the train, namely a railroad tracks portion. A reflected signal portion 336 is reflected from an obstacle 337 on the railroad track and received in the reception array 332. Based on the received signal from object 337 and other received reflected signals, the 2-dimensional intensity signal map is generated. An additional object 338 located outside of the projected path of the train may also be identified by reflected signal portions. In some preferred embodiments, object 338 may be classified as a non-interfering object as it is not located in the path of the train and will not interact with the train along its propagation.

In the instance that an interfering object is detected, an alert may be displayed to an operator (e.g. locomotive pilot) by means of a user interface display, providing a visual indication of the obstacle and its distance from the train. In some embodiments, the alert may be directed to an automatic driving system that determined selected operation such as braking or varying vehicle speed in accordance with the alert data.

Figure 4:
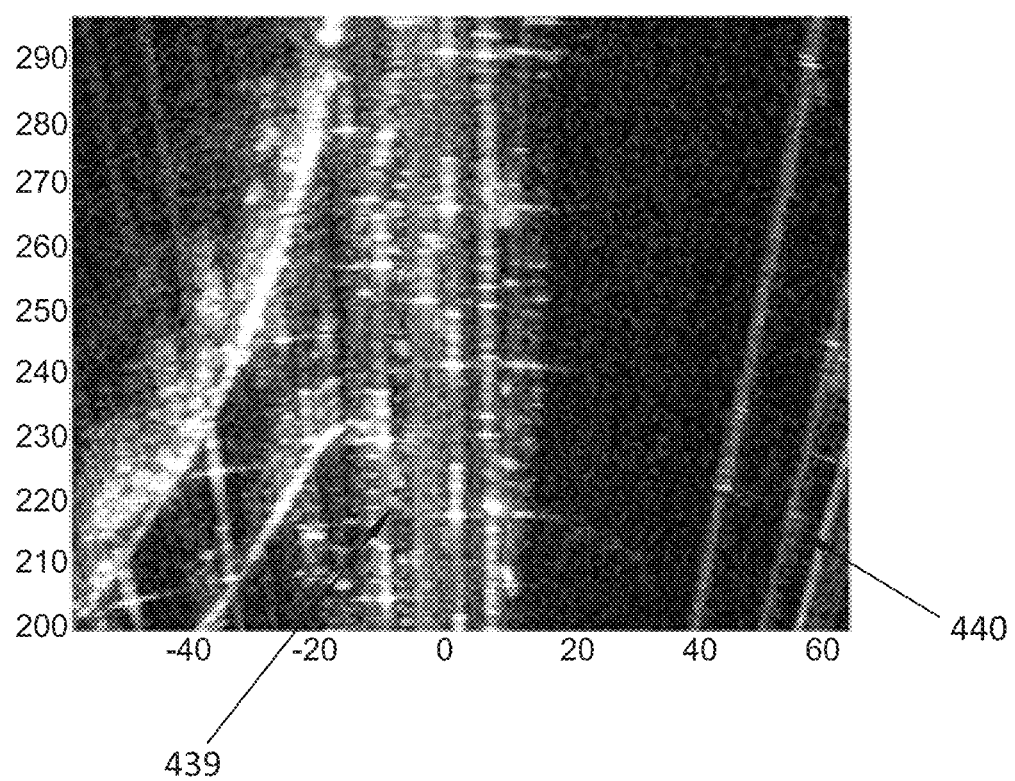
FIG. 4 is an example of a 2-dimensional signal map that is generated based on received reflections of interrogating signals.

FIG. 4 shows an example of a reflected signal map that obtained by collection of reflected signal portions in response to interrogating signals scanning a region of interest. In this non-limiting example, the bright spots along the center of the FIG. 439 are reflections from rail tracks. The bright spots at the right-hand side of the FIG. 440 are reflections of a split of the rail tracks.

Accordingly, as described above, the present technique provides a system for alerting on obstacles in the path of propagation of a vehicle, e.g. train. The present technique utilizes RF interrogation of a region in front of the vehicle and collection of reflected signal portions for generating data on one or more reflecting surfaces/objects in the scanned region, and for processing the collected data for identifying one or more objects located in the region. The present technique may further utilize identifying a relation between one or more objects and projected propagation path of the vehicle for determining interfering objects over non-interfering objects and generating alert data when needed for safe travel of the vehicle.

Figure 5A:
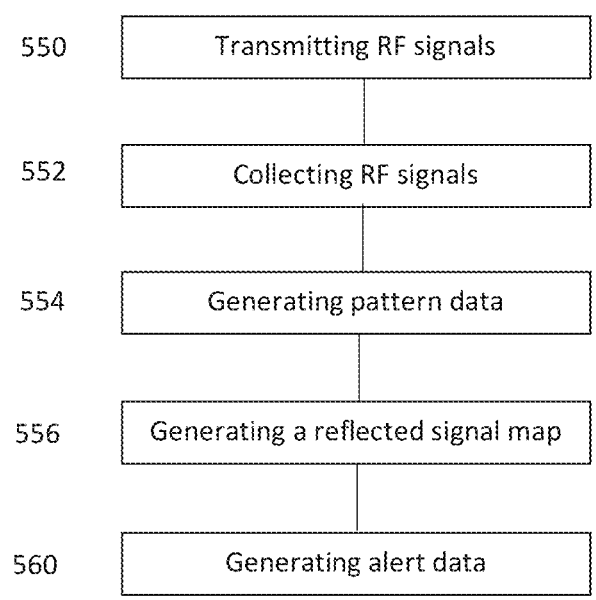
FIGS. 5A-5B are flow-diagrams of non-limiting examples of embodiments of a method according to an aspect of the present disclosure.
Figure 5B:
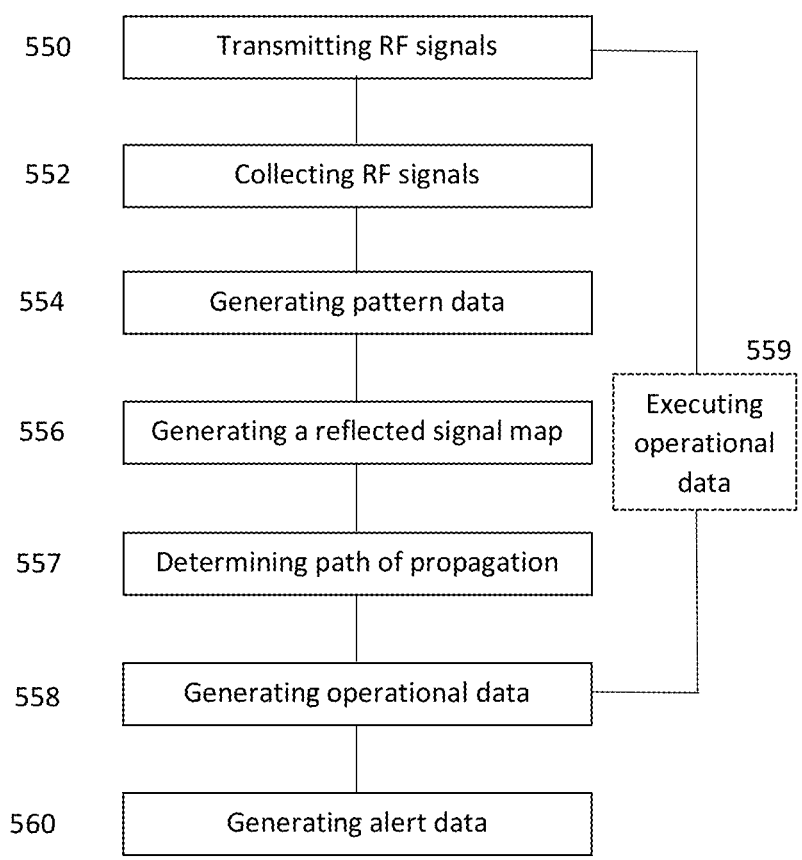

FIGS. 5A-5B are flow diagrams exemplifying non-limiting examples of a method for alerting on objects in a path of propagation of a vehicle according to an aspect of the present disclosure.

Reference is first made to FIG. 5A exemplifying a method that includes transmitting RF signals 550 to a desired selected region and collecting RF reflected signals 552 from the selected region. Generally the transmitted RF signal is formed of relatively narrow beam directed to selected direction within the region of interest. Thus, transmitting the RF signals may be associated with scanning the region of interest with such relatively narrow beam for covering the region of interest with angular scan by the narrow beam. Collecting the RF signals may be associated with collecting signals reflected from the region of interest and analyzing, or pre-analyzing, the collected signals by determining virtual collection beam formed by processing signal portions collected by different antenna elements with proper time/phase delays for identifying distance and direction of source of different reflected signal portions. Based on the collected RF signals, generating pattern data 554 that is indicative of the collected RF signals and distance and direction of reflection sources, and generating based thereon a reflected signal map 556. The reflected signal map is thus constitutes a spatial representation of intensities of the reflected signals with respect to the vehicle. The method further comprising identifying objects in the reflected signal map and generating alert data 560 based on the identified objects, namely the alert data comprises alerts on objects that may interfere with the propagation of the vehicle.

FIG. 5B shows additional example of a method according to some embodiments of the present invention including usage of projected propagation path. As shown, the method exemplified in FIG. 5B includes determining a path of propagation of the vehicle 557 and generating operational data 558 that are indicative of a scanning profile of the selected region. In other words, the operational data comprises instructions for the transmission profile of the RF signals, e.g. direction of transmission, period of time, beam width, intensity, etc. The method may further include executing the operational data 559 and transmitting RF signals based on the operational data, though the alert data is generated irrespectively whether the operational data is executed or not.

Generally, as indicated above, the path of propagation of the vehicle may be determined in accordance with the reflected signal map, i.e. by identifying features associated with the projected path such as rails. Alternatively or additionally, the path may be determined based on pre-stored data on path of the vehicle, and using one or more location techniques (gps, time and speed integration etc.) for determining location of the pre-stored path data.

Thus, the present invention provides a system and a technique for use in detection and alerting on obstacles to simplify and provide safe and fast transportation of selected vehicles. The present technique may provide increased benefits for vehicles with pre-planned path (such as trains) allowing detection of relatively stationary obstacles and eliminating, or at least significantly reducing false positive alerts, e.g. associated with obstacles that are outside of the projected path.

The invention claimed is:

1. A system for alerting on interfering objects in path of vehicle's propagation, the system comprising:
    an RF transmission/reception unit comprising at least one transmitting phased array antenna unit, at least one receiving phased array antenna unit, a main processing unit, and a control unit;
    wherein the RF transmission/reception unit is configured for periodically scanning a selected region by transmission of interrogating RF signal and collecting reflected RF signals from the selected region based on a desired scanning profile and generating based thereon pattern data indicative of the collected RF signal, and for transmitting the pattern data to the control unit;
    wherein the control unit is configured and operable for processing the pattern data for determining existence of interfering object in path of propagation of a vehicle carrying the system, and for generating alert data indicative of existence of one or more of the interfering objects; and
    wherein said vehicle is a train and wherein the control unit is configured and operable for determining path of said vehicle by identifying rails on which said train is moving, and wherein said control unit is configured for selectively limiting scanning region in accordance with projected path of the rails; and
    wherein said processing further comprises:
        obtaining pre-stored data indicative of propagation path of said vehicle in said selected region;
        generating operational data indicative of the desired scanning profile; and
        transmitting the operational data to the RF transmission/reception unit for executing the desired scanning profile.

2. The system of claim 1, wherein said processing comprises generating a reflected signal map of collected reflected RF signals and for analyzing said reflected signal map to identify said one or more interfering objects in said reflected signal map, being indicative of said one or more interfering objects reflecting RF signals in said selected region.

3. The system of claim 2, wherein said reflected signal map comprises a spatial representation of intensities of the reflected signals with respect to the RF transmission/reception unit.

4. The system of claim 2, wherein said processing further comprises identifying, in said reflected signal map, projected path of propagation of said vehicle.

5. The system of claim 4, wherein said processing further comprises identifying for each object in the reflected signal map, a likelihood measure indicative of likelihood of the object to interfere with path of propagation of said vehicle.

6. The system of claim 5, wherein said likelihood measure being determined in accordance with location of the object with respect to the projected path for propagation of said vehicle.

7. The system of claim 5, wherein said likelihood measure is determined using data on projected propagation path profile of the object.

8. The system of claim 1, wherein said processing comprises determining projected propagation path profile of said one or more interfering objects in the pattern data.

9. The system of claim 1, wherein said alert data comprises data indicative of likelihood of a collision of said vehicle with said one or more interfering objects.

10. The system of claim 1, wherein said control unit is further configured for transmitting said alert data for providing data to an operator.

11. The system of claim 1, wherein said RF transmission/reception unit is mounted in front of a vehicle, said selected region comprises a region in front of said vehicle.

12. The system of claim 1, wherein said control unit is connectable to one or more optical imaging units and adapted for receiving image data pieces associated with one or more images of said selected region collected by said one or more optical imaging units, said control unit being configured for processing said image data pieces and determining correlations between said one or more interfering objects detected in said reflected signal map of collected reflected RF signals and objects in said image data pieces for determining data on the detected interfering objects.

13. The system of claim 1, further comprising one or more optical imaging units adapted for collecting one or more image data streams and to transmit to the control unit image data pieces associated with said one or more image data streams collected from said selected region by said one or more optical imaging units, said control unit being configured for processing said image data pieces and determining correlations between said one or more interfering objects detected in said reflected signal map of collected reflected RF signals and objects in said image data pieces for determining data on the detected one or more interfering objects.

14. The system of claim 13, further comprising a user interface for presenting selected image data and marking existence and location of detected object in the image data based on the correlation between said one or more interfering objects detected in said reflected signal map of collected reflected RF signals and objects in said image data pieces.

15. The system of claim 13, wherein said one or more optical imaging units comprise imaging units operable in one or more of the following wavelength ranges: visible spectrum, shortwave infrared and long wave infrared.

16. The system of claim 13, further comprising one or more light sources configured to provide illumination of one or more selected wavelength ranges detectable by the one or more optical imaging units;
wherein said control unit further comprises illumination controller configured for receiving data on said one or more interfering objects detected in the region of interest based on processing the pattern data, said illumination controller is thereby operable for operating the one or more light sources for directing illumination toward selected location in accordance with location of said one or more interfering objects.

17. The system of claim 16, wherein at least one of the one or more optical imaging units is configured for selectively collecting image data streams at selected time periods based on illumination operating data associated with estimated distance of said one or more interfering objects to be visualize.

18. The system of claim 1, wherein said control unit comprises:
a signal map generating module configured for receiving data on reflected RF signal and for generating corresponding reflected signal map comprising at least two-dimensional data indicative of said one or more interfering objects reflecting RF signals in said selected region.

19. The system of claim 18, wherein said control unit further comprising an image recognition module configured and operable for receiving and processing said reflected signal map for identifying one or more objects associated with said one or more interfering objects reflecting RF signals in said selected region.

20. The system of claim 19, wherein said control unit further comprising a vehicle projected path module configured and operable for identifying projected path of the vehicle in said reflected signal map.

21. The system of claim 18, wherein said control unit further comprises an obstacle identifying module configured and operable for processing said reflected signal map for determining a relative position of said one or more interfering objects with respect to projected propagation path of the vehicle, thereby determining obstacle level of said one or more interfering objects.

22. The system of claim 1, wherein said at least one phased array antenna unit of said RF transmission/reception unit is configured for generating RF beam scanning said selected region and for collecting reflected signal therefrom for providing data of reflected RF signals.

23. The system of claim 22, wherein said RF transmission/reception unit comprises at least one receiving phased array antenna unit.

24. The system of claim 22, wherein said RF transmission/reception unit comprises at least one transmitting phased array antenna unit.

25. The system of claim 22, wherein said at least one phased array antenna unit is configured with a large aperture with respect to wavelength of said RF signal.

26. The system of claim 22, wherein said at least one phased array antenna unit is configured to provide narrow scanning beam having a high angular resolution for scanning.

27. The system of claim 22, wherein said at least one phased array antenna unit comprises sufficient number of elements to produce real beam resolution compatible with said obstacle size arranged in at least one-dimensional array along width dimension of the vehicle.

28. The system of claim 1, wherein the RF transmission/reception unit is configured to selectively filter reflected signals according to their distance from the system.

29. The system of claim 28, wherein the RF transmission/reception unit is configured to receive signals in predetermined time slots for detecting reflected signals from a predetermined sub-region.

30. A method for alerting on one or more interfering objects in a path of a vehicle's propagation, the method comprising:
transmitting an interrogating RF signal to a selected region by scanning a narrow interrogating beam to cover the region of interest and collecting reflecting RF signals therefrom based on a desired scanning profile;
generating pattern data indicative of the collected RF signals;
processing the pattern data to determine existence of one or more interfering object in the path of propagation of the vehicle, said processing comprises generating a reflected signal map of collected reflected RF signals and analyzing said reflected signal map to identify said one or more interfering objects in said reflected signal map, being indicative of existence and location of said one or more interfering objects reflecting RF signals in said selected region, said signal map comprising a spatial representation of intensities of the reflected signals with respect to the vehicle's location; and
generating alert data indicative of existence of said one or more interfering objects; wherein said vehicle is a train and wherein said processing comprises determining path of said vehicle by identifying rails on which said train is moving, and selectively limiting scanning region in accordance with projected path of the rails;
wherein said processing further comprises:
obtaining pre-stored data indicative of propagation path of said vehicle in said selected region; and
generating operational data indicative of the desired scanning profile; and executing the desired scanning profile.

31. The method of claim 30, wherein said processing comprises generating a reflected signal map of collected reflected RF signals and analyzing said reflected signal map to identify said one or more interfering objects in said reflected signal map, being indicative of said one or more interfering objects reflecting RF signals in said selected region.

32. The method of claim 31, wherein said reflected signal map comprises a spatial representation of intensities of the reflected signals with respect to the vehicle's location.

33. The method of claim 30, wherein said processing comprising determining projected propagation path profile of said one or more interfering objects in the pattern data.

34. The method of claim 30, wherein said processing further comprises identifying, in said reflected signal map, projected path of propagation of said vehicle.

35. The method of claim 34, wherein said processing further comprises identifying for each object in the reflected signal map, a likelihood measure indicative of likelihood of the object to interfere with path of propagation of said vehicle.

36. The method of claim 35, wherein said likelihood measure being determined in accordance with location of the object with respect to the projected path for propagation of said vehicle.

37. The system of claim 36, wherein said likelihood measure is determined using data on projected propagation path profile of the object.

38. The system of claim 30, wherein said alert data comprises data indicative of likelihood of a collision of said vehicle with said one or more interfering objects.

39. The method of claim 30, further comprising transmitting said alert data to an operator.

40. The method of claim 30, wherein said selected region comprises a region in front of said vehicle.

41. The method of claim 30, further comprising receiving image data pieces associated with one or more images of said selected region collected and processing said image data pieces to determine correlations between said one or more interfering objects detected in said reflected signal map of collected reflected RF signals and objects in said image data pieces for determining data on the detected said one or more interfering objects.

42. The method of claim 41, further comprising presenting selected image data and marking existence and location of detected object in the image data based on the correlation between said one or more interfering objects detected in said reflected signal map of collected reflected RF signals and objects in said image data pieces.

43. The method of claim 41, further comprising imaging at least portions of the selected region to obtain said image data pieces with one or more of the following wavelength ranges: visible spectrum, shortwave infrared and long wave infrared.

44. The method of claim 30, further comprising selectively filtering reflected signals according to their distance from the vehicle.

* * * * *